United States Patent
Matveev

(10) Patent No.: US 12,362,636 B2
(45) Date of Patent: Jul. 15, 2025

(54) ENERGY CONVERSION SYSTEM

(71) Applicant: Alva Industries AS, Trondheim (NO)

(72) Inventor: Alexey Matveev, Trondheim (NO)

(73) Assignee: Alva Industries AS, Trondheim (NO)

( * ) Notice: Subject to any disclaimer, the term of this patent is extended or adjusted under 35 U.S.C. 154(b) by 252 days.

(21) Appl. No.: 17/927,421

(22) PCT Filed: May 27, 2021

(86) PCT No.: PCT/NO2021/050136
§ 371 (c)(1),
(2) Date: Nov. 23, 2022

(87) PCT Pub. No.: WO2021/242116
PCT Pub. Date: Dec. 2, 2021

(65) Prior Publication Data
US 2023/0208256 A1    Jun. 29, 2023

(30) Foreign Application Priority Data

May 27, 2020   (NO) .................................. 20200623

(51) Int. Cl.
*H02K 11/33*   (2016.01)
*H02K 9/00*   (2006.01)
*H02K 11/21*   (2016.01)

(52) U.S. Cl.
CPC .............. *H02K 11/33* (2016.01); *H02K 9/00* (2013.01); *H02K 11/21* (2016.01)

(58) Field of Classification Search
CPC .......... H02K 1/12; H02K 11/33; H02K 16/04; H02K 3/28; H02K 2213/12; H02K 7/1838
See application file for complete search history.

(56) References Cited

U.S. PATENT DOCUMENTS

| | | | |
|---|---|---|---|
| 4,641,080 A | 2/1987 | Glennon et al. | |
| 6,946,750 B2* | 9/2005 | Wobben | F03D 7/0272 290/55 |
| 9,712,100 B2* | 7/2017 | Yoshizawa | H02K 11/33 |
| 10,756,606 B2 | 8/2020 | Galmiche et al. | |
| 2004/0100102 A1 | 5/2004 | Wobben | |
| 2009/0212568 A1 | 8/2009 | Maibach et al. | |
| 2009/0278415 A1 | 11/2009 | Park | |

(Continued)

FOREIGN PATENT DOCUMENTS

| | | | |
|---|---|---|---|
| EP | 2685602 A1 * | 1/2014 | H02K 1/12 |
| GB | 1366305 | 9/1974 | |
| WO | 2012093942 A1 | 7/2012 | |

OTHER PUBLICATIONS

International Search Report and Written Opinion mailed Sep. 10, 2021 for International Patent Application No. PCT/NO2021/050136.

*Primary Examiner* — Leda T Pham
(74) *Attorney, Agent, or Firm* — Alix, Yale & Ristas, LLP

(57) ABSTRACT

A power conversion system comprising an electric machine and at least two power electronics converters, wherein the electrical machine comprises at least one current carrying component, wherein the current carrying component consists of at least two concentric rings forming the current carrying component. The at least two concentric rings are not galvanically or electrically connected to each other and each concentric ring is galvanically connected to at least one power converter via its machine side terminals.

19 Claims, 7 Drawing Sheets

(56) References Cited

U.S. PATENT DOCUMENTS

| | | | |
|---|---|---|---|
| 2011/0241453 A1 | 10/2011 | Idland et al. | |
| 2011/0291413 A1* | 12/2011 | Wamble, III | F03D 9/25 290/55 |
| 2016/0181893 A1* | 6/2016 | Shrestha | H02K 11/33 310/60 R |
| 2019/0058430 A1 | 2/2019 | Mao et al. | |
| 2020/0244149 A1* | 7/2020 | Selnes | H02K 15/02 |

* cited by examiner

ENERGY CONVERSION SYSTEM

BACKGROUND

The disclosed embodiments are related to energy conversion system.

The background for the disclosure will be segmented electric machines, multi-winding electric machines and energy conversion systems with high-voltage output comprising multiple power electronics converters connected in series.

It is a widely adapted practice to design and make stators or rotors of electric machines of segments. Segmentation of the stator or the rotor is often done for easier manufacturing/assembly. Some designs of electric machines are possible only with segmented cores. Segmentation is done according to sectors around the circumference of the ring or the disk comprising the stator or the rotor, where each sector is understood as "a geometric figure bounded by two radii and the included arc of a circle".

Some examples of segmented solutions for machines with ferromagnetic cores are GB1366305A, U.S. Pat. No. 4,641,080A, EP3309930A1. One example of a segmented solution for ironless machines is NO328765B1.

It is also well known in the industry to have multiple windings in electric machines and supply the windings from different power electronics converters. It is known to switch off faulted segments of an electric machine, though the magnetic field distribution along the circumference loses symmetry.

Many of the prior art publications describe generator mode applications. The main purpose is to have a system that does not require a transformer. Voltage gets stepped up by connecting power electronics converters in series. The prior art addresses mostly medium-voltage and high-voltage systems. For example, US2009212568A1 discloses an energy conversion system with a multi-winding machine and power electronics converters connected in series to form high-voltage output from a wind power converter.

There exist some variations of this solution. For example, NO332201B1 discloses an energy conversion system, which allows generating power at medium voltage while having the low-voltage insulation of the windings in the electric machine.

In the PhD thesis "Analysis and control of a modular series connected converter for a transformerless offshore wind turbine" by Sverre Gjerde (NTNU, Trondheim, October 2013) the concepts similar to the solutions in US2009212568A1 and NO332201B1 with segmented design of the multi-winding machines are investigated in detail.

The prior art solutions are mostly targeting power generation applications at medium voltage level, there is, however, the need to address low-voltage applications and even ultra-low-voltage applications.

Ultra-low-voltage power electronics converters (<100 V) have higher power density than low-voltage power electronics converters (100-1000 V), therefore, solutions allowing the use of ultra-low-voltage converters with low-voltage power sources would help reducing weight and cost of the electronics which is very helpful in e.g. aerial applications, such as drone applications.

SUMMARY

Provided herein is an energy conversion system that partly or entirely solves the drawbacks of prior art.

Also provided is a low-weight energy conversion system.

Also provided herein is a redundant energy conversion system.

Also provided is a redundant energy conversion system maintaining fully symmetrical pattern of magnetic field around the circumference of a stator or rotor of an electrical machine even when one of the power electronics converters or a part of the stator or rotor is faulted.

Also provided is a redundant energy conversion system allowing the use of ultra-low voltage power electronics converters with low-voltage power sources.

The disclosed energy conversion system comprises an electrical machine and at least two power electronics converters.

The electric machine is of radial-flux configuration. The electric machine comprises at least one current carrying component, such as a part of a stator or a rotor, which will contain a winding. The winding is made in a certain pattern which, when carrying electric current of a certain frequency with a certain waveform, will produce magnetic field of a desired spatial distribution and motion pattern. Alternatively, the magnetic field when applied to the winding will produce electric current. The two modes described above are the motoring mode and the generating mode, respectively. The at least one current carrying component comprises a ring (a hollow cylinder) which is elongated in the axial direction, perpendicular to the diameter of the ring. Thickness of the ring is defined in the plane of the diameter of the ring. The ring can contain ferromagnetic parts ("iron") as well as be "ironless". The current carrying component can be attached to a ferromagnetic core, like in slotless electric machines, or have no direct mechanical contact with ferromagnetic cores, like in ironless machines.

According to the disclosure, the ring is formed by several concentric rings, i.e. at least two concentric rings. Thus, the current carrying component consists of several concentric current carrying sub components. It can be described as one thick ring consisting of several (thin) concentric rings. The concentric rings have different diameters to fit inside each other.

In one embodiment, the concentric rings are made of litz wire or solid wire and epoxy or other matrix material. For example, the concentric rings or their parts can be made of electromagnetic mats moulded in some matrix material.

In a further embodiment, the concentric rings contain ferromagnetic elements within the bodies of the rings. For example, the electromagnetic mat can contain both copper fibres and ferromagnetic fibres, objects, particles, etc.

The concentric rings are not galvanically or electrically connected to each other, so each concentric ring can be independently operated such as it was the stator or rotor of a separate independent electric machine. There can be insulation between the concentric rings if needed.

In embodiments, the winding patterns of the concentric rings can be aligned with each other, however, in some embodiments the concentric rings can be displaced by a certain angle to create a skew.

Each of the power electronics converters has so-called machine side terminals and non-machine side terminals. The power electronics converters are connected to the electric machine on the machine side terminals.

Each concentric ring is galvanically connected to at least one power electronics converter via its machine side terminals.

According to a further embodiment, the concentric rings are not connected to all the power electronics converters simultaneously.

In the main embodiment, the waves of current in the concentric rings can be synchronized to produce aligned magnetic fields.

In one embodiment, at least two of the power electronics converters are connected in series through their non-machine side terminals. It allows using ultra-low voltage power electronics converters with low-voltage power source achieving weight reduction.

In other embodiments, the power electronics converters can be connected in parallel.

In some embodiments, the concentric rings can also be made of segments. These segments can be connected to separate power electronics converters.

For better synchronization of the waves of currents in the concentric rings, the control of the electric machine can be performed with the help of a position sensor.

In some embodiments, the current waveforms in the different concentric rings can be arranged relative to each other in such a way as to cancel out harmful harmonics.

In some embodiments, at least one element is arranged between the concentric rings, such as cooling ducts, insulation, etc.

The disclosed embodiments enable packaging solutions, where the power electronics converters are surrounded by the concentric rings to form an integrated design. Thus, the power electronics unit will be located in the centre of the electric machine.

In some embodiments, a combination of AC and DC current is enabled, by that some of the concentric rings are fed by AC current and some concentric rings are fed by DC current.

The embodiments provide an energy conversion system with lower weight than comparable prior art systems.

The embodiments further provide a redundant energy conversion system capable of maintaining fully symmetrical pattern of magnetic field around the circumference of a current carrying component, such as a part of a stator or rotor, of the electrical machine even when one of the power electronics converters or a part of current carrying component is faulted.

The energy conversion system is allowing the use of ultra-low voltage power electronics converters with low-voltage power sources, something that reduces weight and costs of the energy conversion system and components therein.

Further preferable features and advantageous details of the disclosed embodiments will appear from the following detailed description, claims and attached drawings.

BRIEF DESCRIPTION OF THE DRAWINGS

The present invention will below be described in more detail with reference to the attached drawings, where.

DETAILED DESCRIPTION

Figure 1:
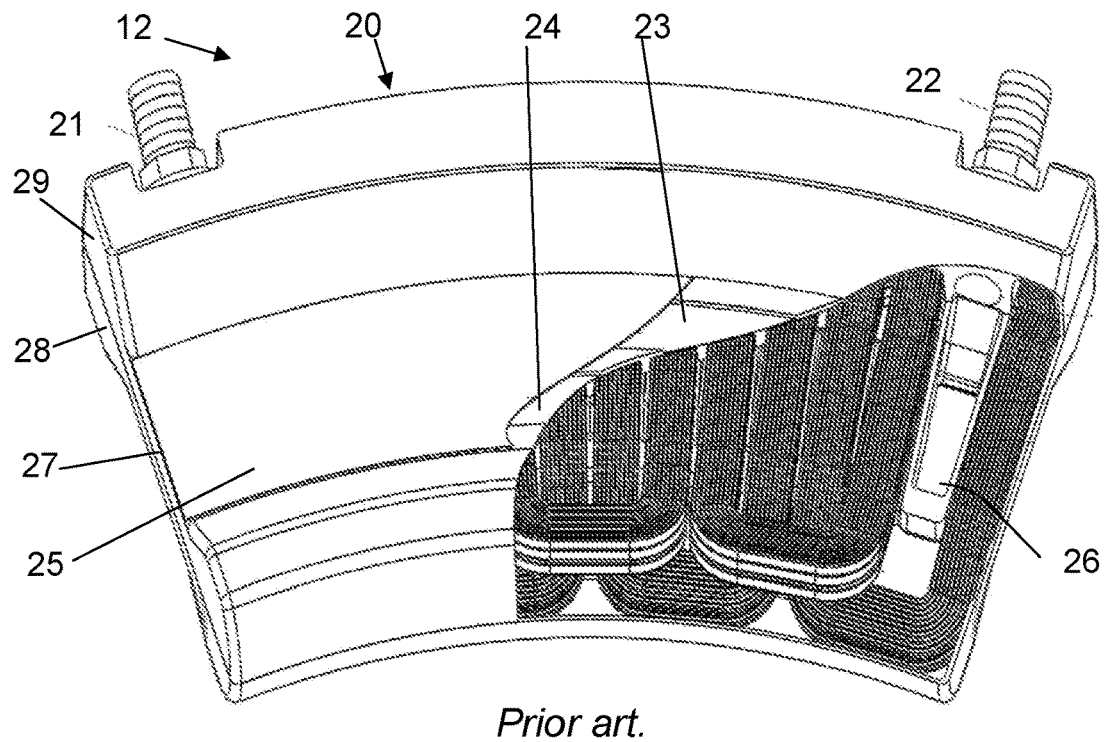
FIG. 1 shows a segmented ironless machine according to prior art.

Reference is now made to FIG. 1, which is a principle drawing of a segmented ironless machine according to prior art NO328765B1.

Figure 2:
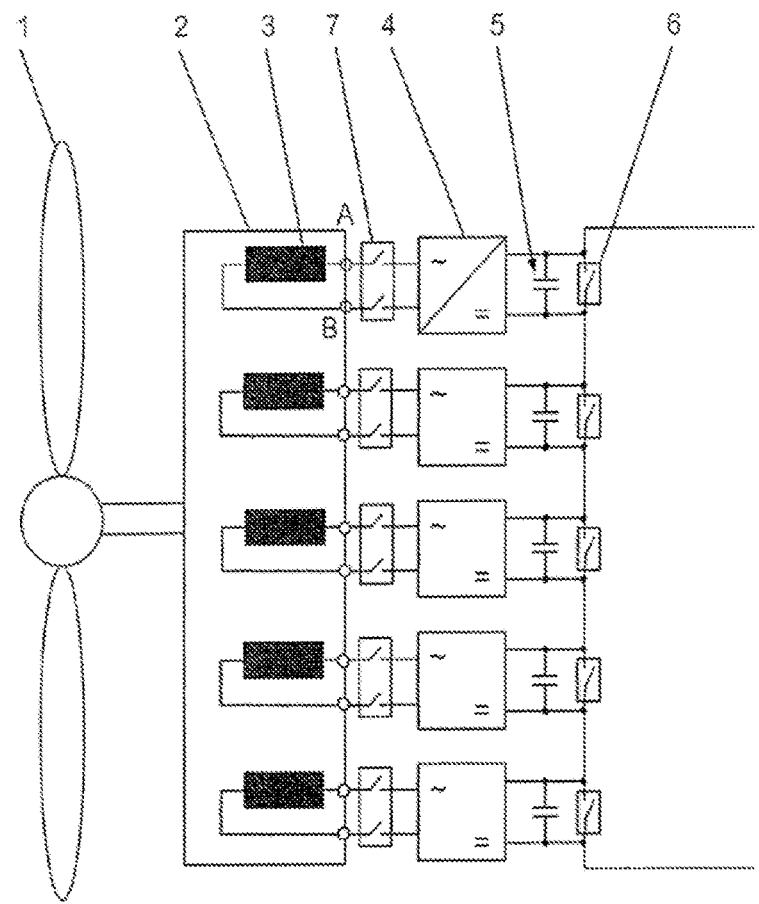
FIG. 2 shows a wind energy conversion system according to prior art.

Reference is now made to FIG. 2, which is a principle drawing of a wind energy conversion system according to prior art US2009212568A1.

Figure 3:
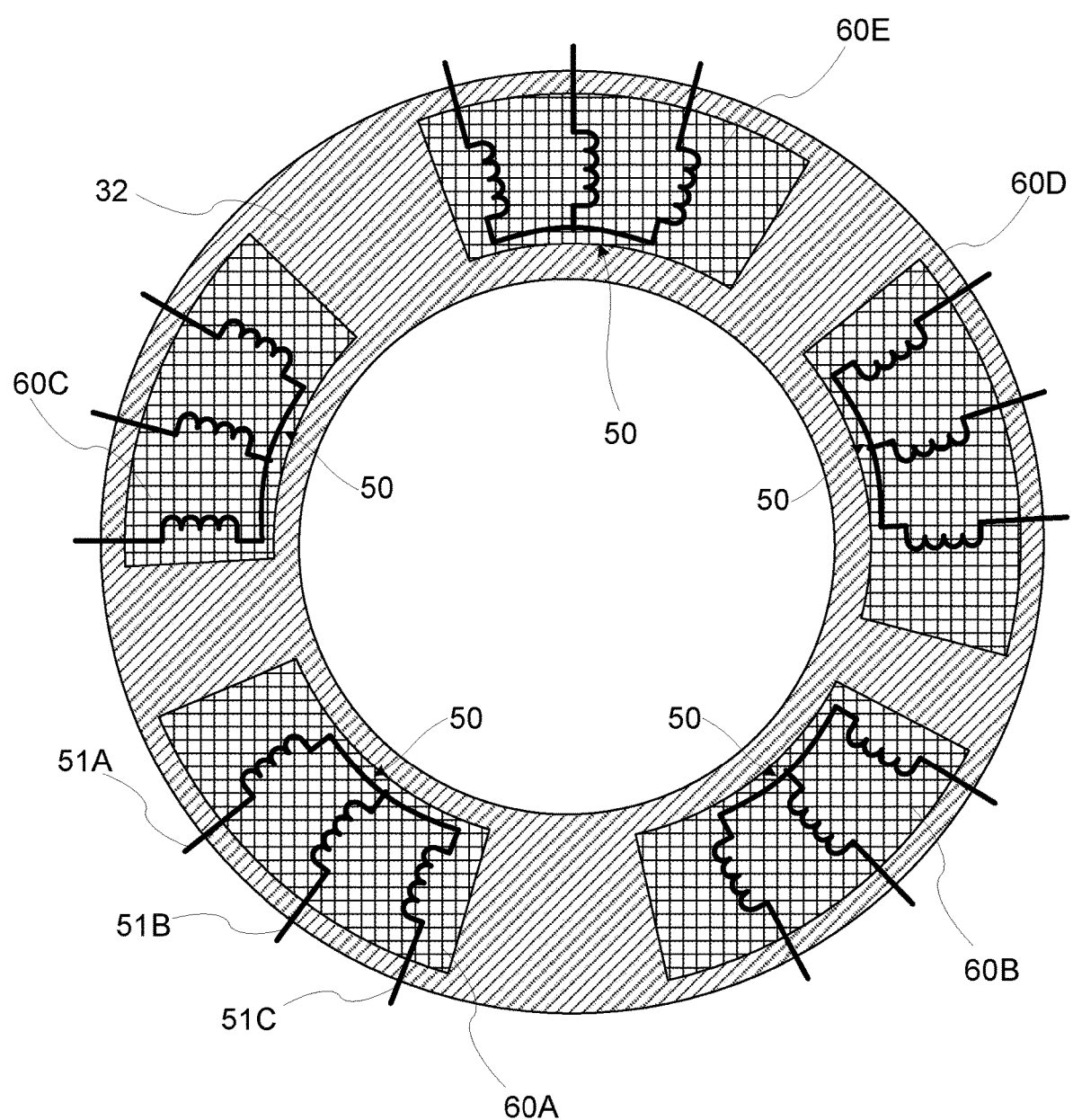
FIG. 3 shows segments and windings of electric machine according to prior art.

Reference is now made to FIG. 3, which is a principle drawing of segments and windings of an electric machine according to prior art NO332201B1.

Figure 4:
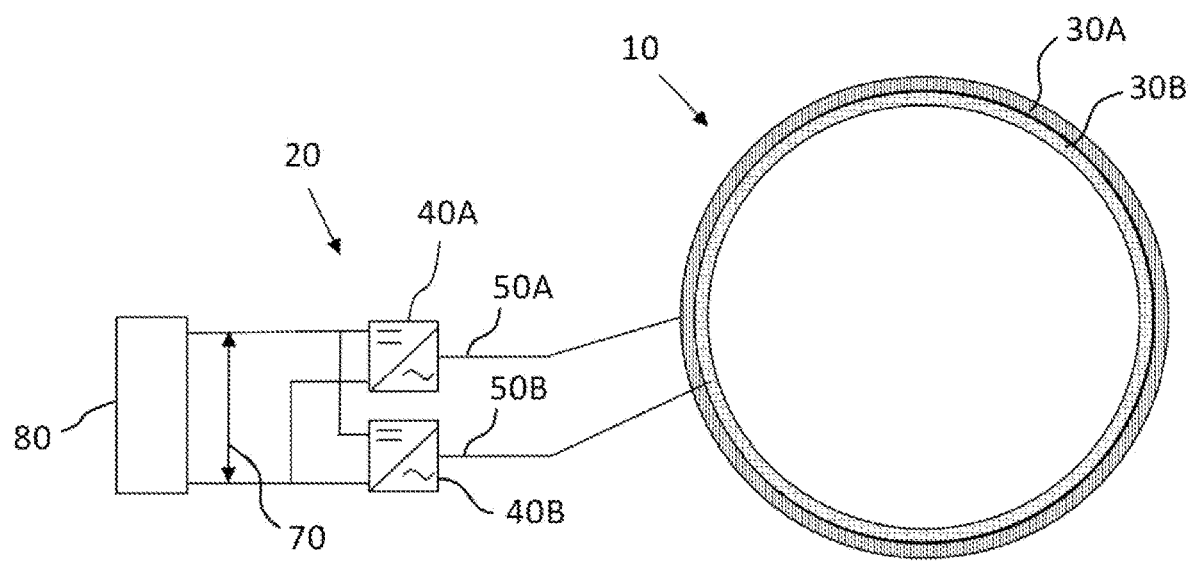
FIG. 4 is a principle drawing of a first embodiment of an energy conversion system according to the disclosure.

Reference is now made to FIG. 4 showing a first embodiment of an energy conversion system. An energy conversion system comprises an electric machine and at least two power electronics convertors 40a-b forming a group 20 of power electronic converters. The electric machine comprises at least one current carrying component 10, such as a part of a rotor or stator. In the first embodiment the current carrying component 10 of the electric machine consists of two concentric rings 30A-B, namely outer ring 30A and inner ring 30B, which together form the current carrying component 10. The current carrying component 10 is connected to the group 20 of power electronics converters, which in the shown embodiment consists of two power electronics converters 40A, 40B. The concentric rings 30A-B and the power electronics converters 40A-B are connected by connection lines 50A, 50B, respectively. The connection lines 50A-B can be DC cables, singe-phase or multi phase AC cables. In the embodiment of FIG. 4 the two concentric rings 30A-B and power electronics converters 40A-B are connected in parallel to the same power source 80. In more detail, the AC connection line 50A connects machine side terminals of the DC/AC power electronics converter 40A and the outer concentric ring 30A and the AC connection line 50B connects machine side terminals of the DC/AC power electronics converter 40B and the inner concentric ring 30B. In the basic and most common variant, the AC connection line 50B has three phases. The power electronics converter group 20 is connected at non-machine side terminals to the power source 80 in parallel by a DC link, which has certain voltage 70 across it.

The individual DC/AC power electronics converter 40A-B would usually have capacitors on the DC side (not shown in the figures). Alternatively, or in addition, there can be capacitors across the DC link (not shown in the figures).

The energy conversion system of the embodiment in FIG. 4 is shown with two concentric rings 30A-B, but in general, the energy conversion system according to the disclosure can have three, four or more concentric rings 30A-B. The power electronics converters 40A-B can be not only of DC/AC type as shown in FIG. 4 and the other following figures, but also of AC/AC, AC/DC, DC/DC type. The power source 80 can be a DC power source and AC power source. If the power electronics converters are of AC/DC or AC/AC type then the link between the source 80 and the power electronics converter 40A-B can be AC link, not DC link.

Figure 5:
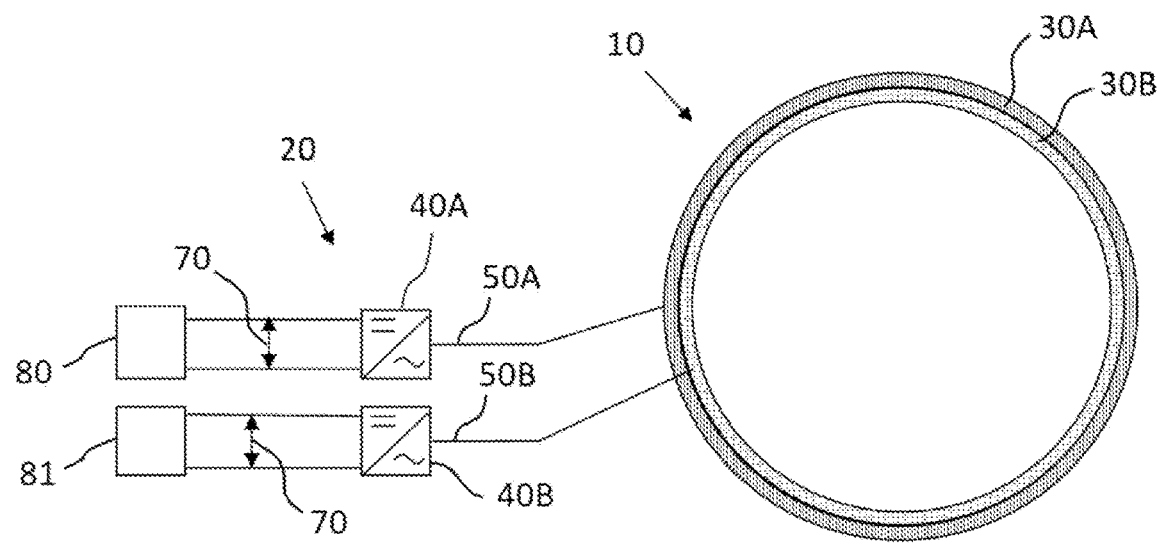
FIG. 5 is a principle drawing of a second embodiment of the energy conversion system according to the disclosure.

Reference is now made to FIG. 5 showing a principle drawing of a second embodiment of the energy conversion system. In the second embodiment the individual power electronics converters 40A-B are fed from separate power sources 80 and 81, respectively. The voltage 70 of the two power sources 80, 81 can be the same or different.

Figure 6:
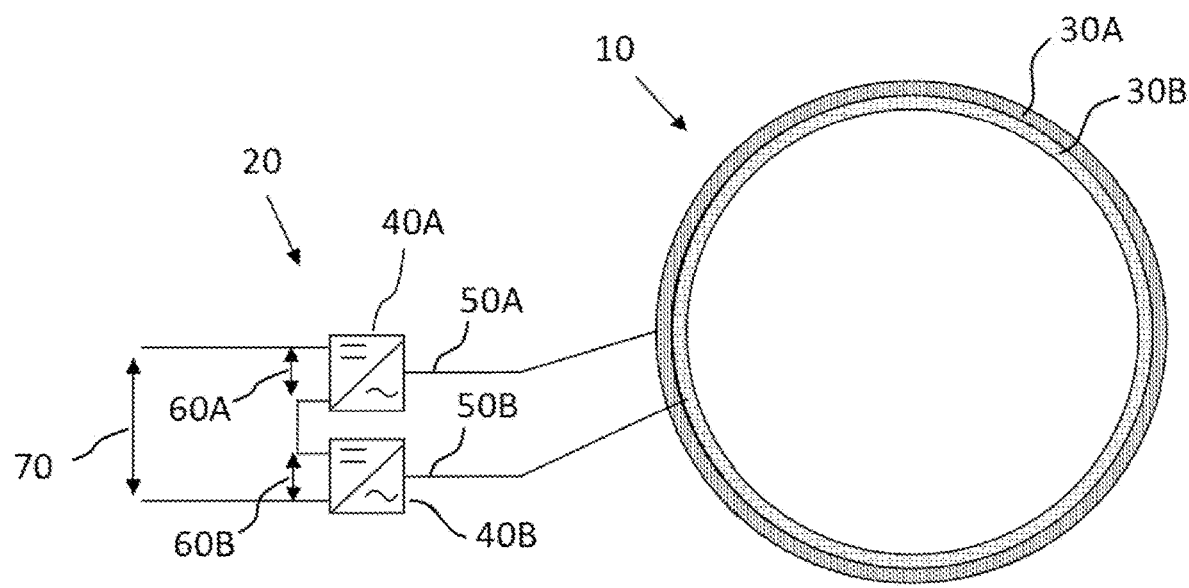
FIG. 6 is a principle drawing of a third embodiment the energy conversion system according to the disclosure.

Reference is now made to FIG. 6 showing a principle drawing of a third embodiment of the energy conversion system. In the third embodiment the two power electronics converters 40A-B are connected in series through the non-machine side terminals and are further connected to the same power source 80 (shown in FIG. 4) with voltage 70. The sum of the voltages 60A, 60B of the two power electronics converters 40A-B equals the voltage 70 of the power source 80 (shown in FIG. 4). This type of connection allows the use of power electronics converters 40A-B with lower voltage rating than the voltage rating of the power source 80 (shown in FIG. 4). The voltage rating of the power electronics converters 40A-B can in this embodiment be a half of the voltage rating of the power source 80 (shown in FIG. 4).

Figure 7:
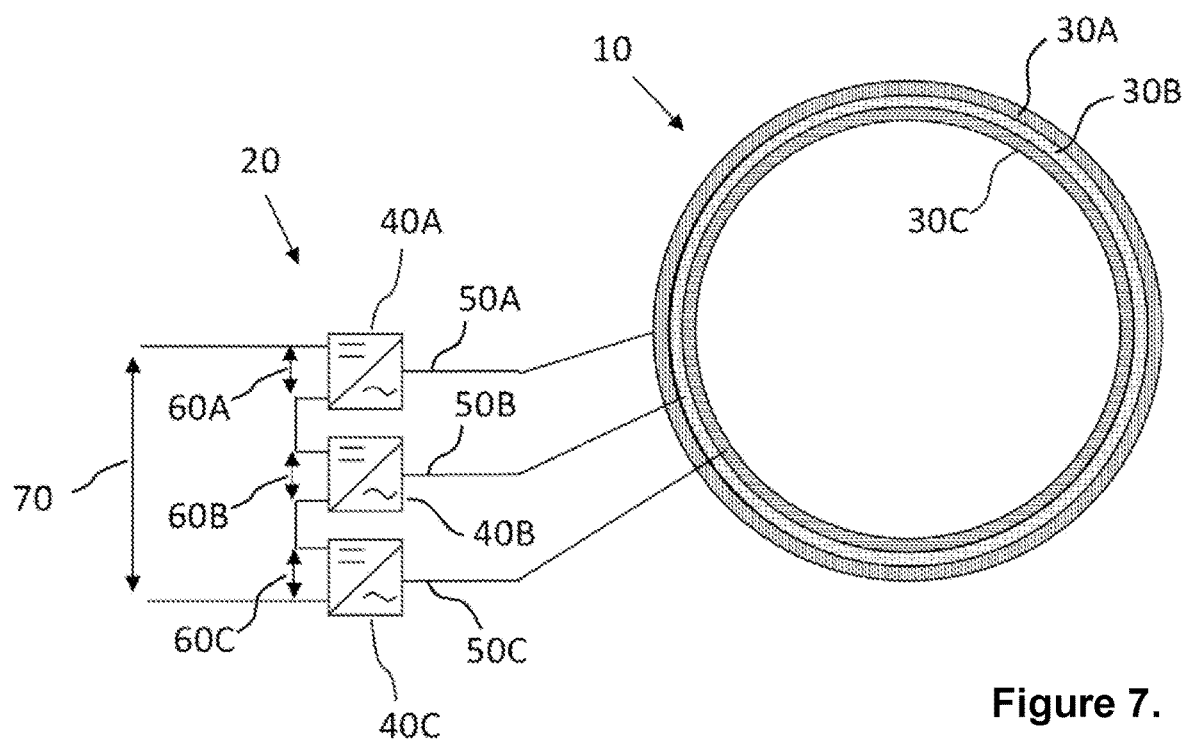
FIG. 7 is a principle drawing of a fourth embodiment of the energy conversion system according to the disclosure.

Reference is now made to FIG. 7 showing a principle drawing of a fourth embodiment of the energy conversion system. In the fourth embodiment, the current carrying component 10 consists of three concentric rings 30A, 30B, 30C and where three power electronics converters 40A, 40B, 40C are connected in series through the non-machine side terminals and are further connected to the same power source 80 (shown in FIG. 4) with voltage 70. The sum of the voltages 60A, 60B, 60C of the three power electronics converters 40A, 40B, 40C, respectively, equals the voltage 70 of the power source 80 (shown in FIG. 4). The voltage rating of the power electronics converter 40A-C can in this embodiment be a third of the voltage rating of the power source 80 (shown in FIG. 4).

The number of the concentric rings 30A-C can be more than three. The number of the power electronics converters 40A-C connected in series through the non-machine side terminals can also be more than three.

Figure 8:
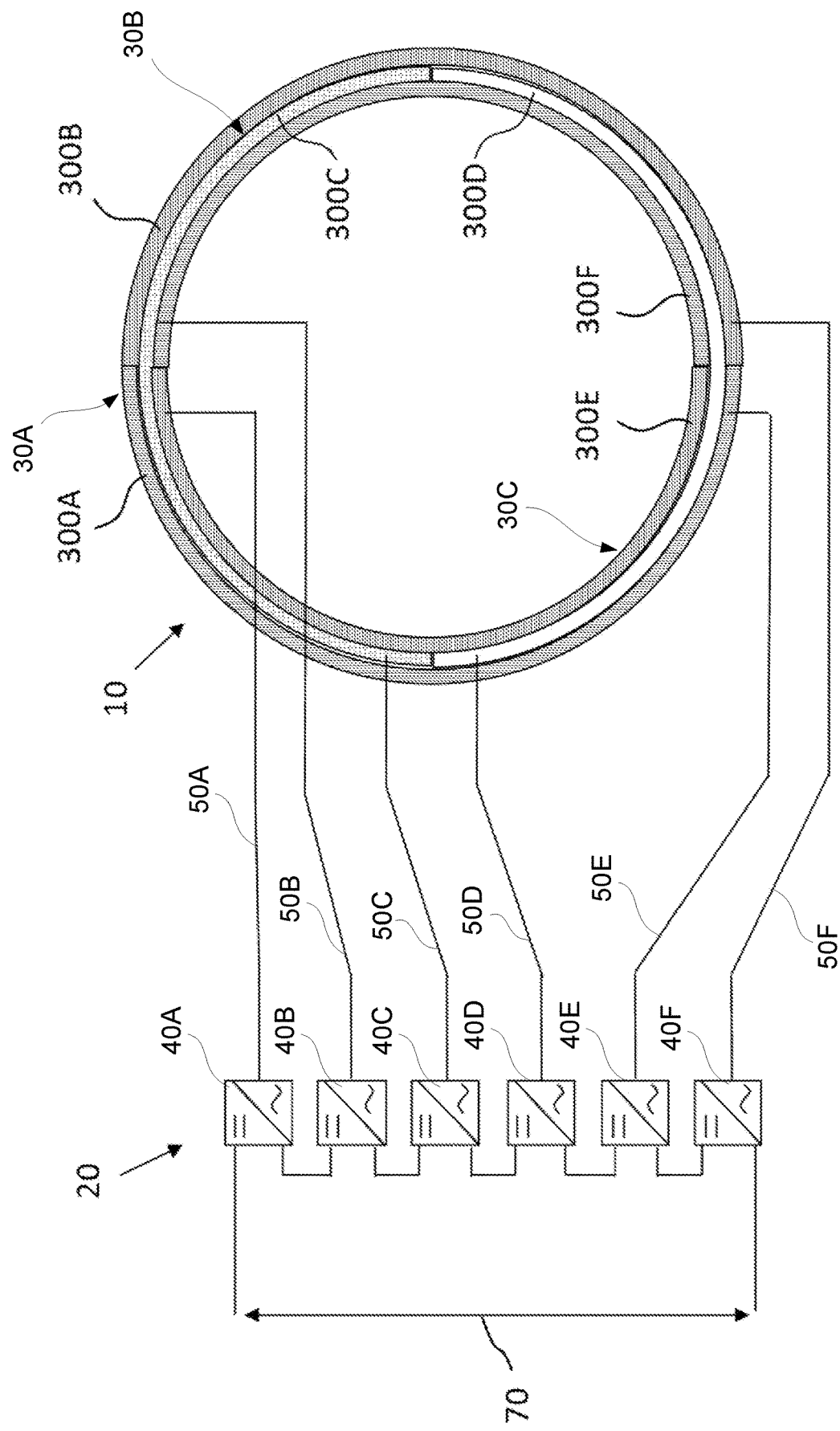
FIG. 8 is a principle drawing of a fifth embodiment of the energy conversion system according to the disclosure.

Reference is now made to FIG. 8 showing a principle drawing of a fifth embodiment of the energy conversion system. In fifth embodiment, the concentric rings 30A-C are made of segments 300A and 300B, 300C and 300D, and 300E and 300F, respectively. In this embodiment, each concentric ring 30A-C consists of two segments 300A-B, 300C-D and 300E-F, respectively. The group 20 of power electronics converters, in this embodiment, comprises six power electronics converters 40A-F connected to the same power source 80 (shown in FIG. 4) and where the six power electronics converters 40A-F are connected in series through the non-machine side terminals and where each power electronics converter 40A-F is connected to a separate segment 300A-F via the machine-side terminals. The segments 300A-F can be turned relative to each other to form various patterns.

Figure 9:
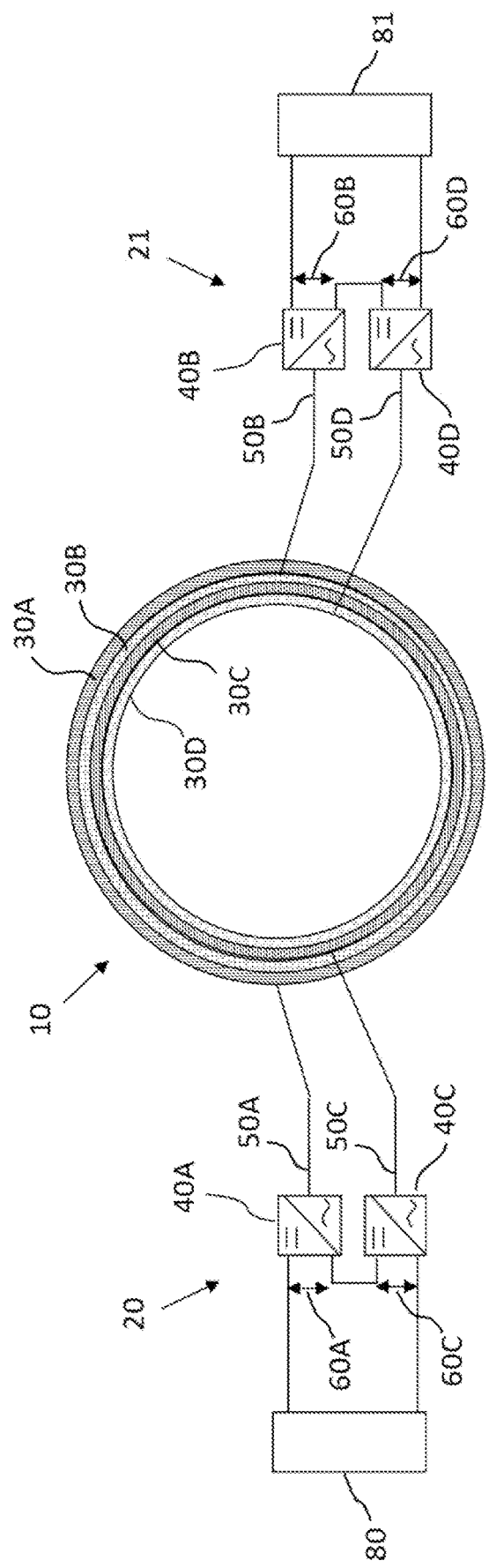
FIG. 9 is a principle drawing of a sixth embodiment of the energy conversion system according to the disclosure.

Reference is now made to FIG. 9 showing a principle drawing of a sixth embodiment of the energy conversion system. In the sixth embodiment, the current carrying component 10 consists of four concentric rings 30A, 30B, 30C, 30D. In the sixth embodiment, pairs of the concentric rings 30A-D are fed from different groups 20, 21 of power electronics converters 40A-D fed from different power sources 80, 81. In more detail, two of the concentric rings 30A, 30C are fed by a first group 20 of power electronics converters 40A and 40C fed from a first power source 80 and the concentric rings 30B, 30D are fed by a second group 21 of power electronics converters 40B and 40D fed from a second (different) power source 81. The individual power electronics converters 40A, 40B, 40C, 40D can be connected in series on non-machine side terminals as shown in FIG. 9 or alternatively they can be connected in parallel.

The number of the power electronics converter groups 20-21, and the power electronic converters 40A-D can be more than two.

Figure 10:
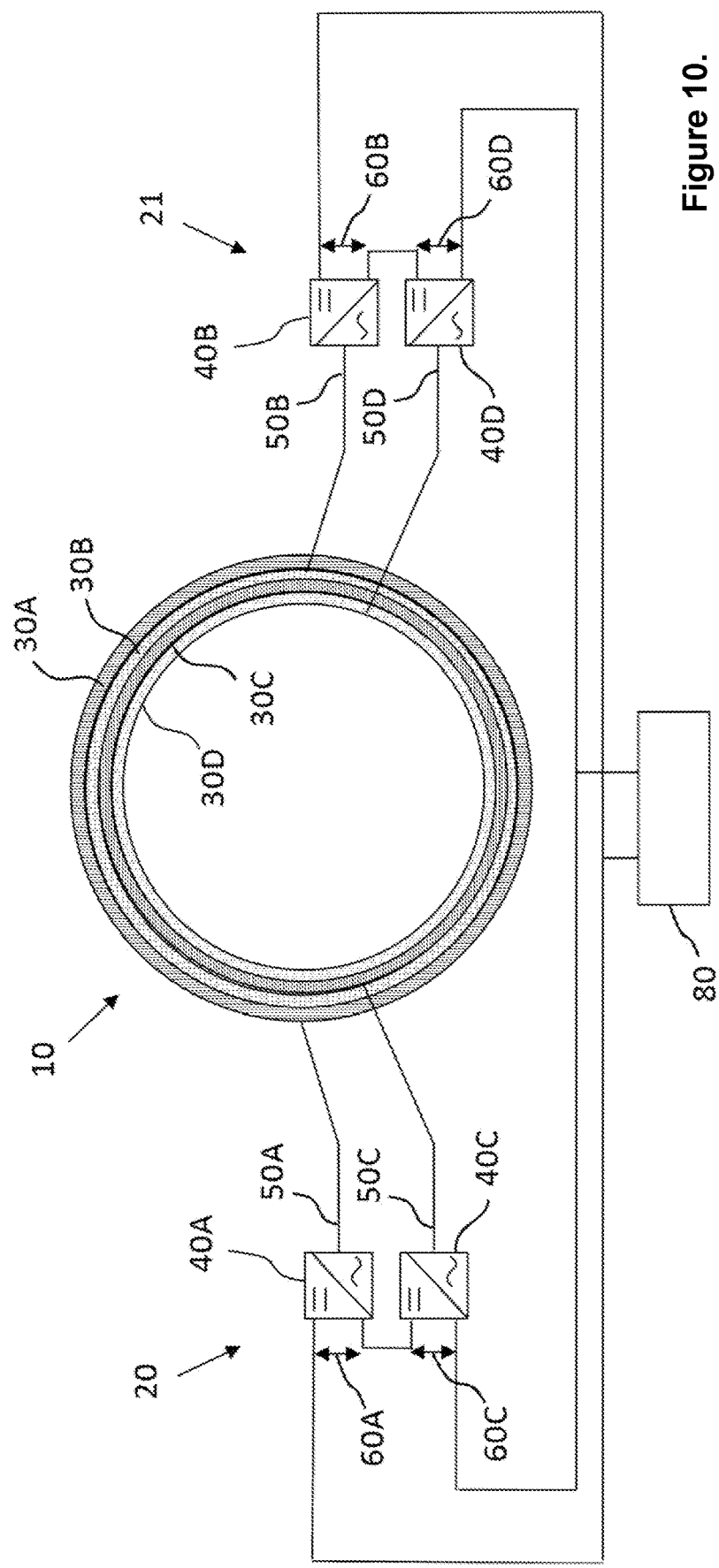
FIG. 10 is a principle drawing of a seventh embodiment of the energy conversion system according to the disclosure.

Reference is now made to FIG. 10 showing a principle drawing of a seventh embodiment of the energy conversion system. The seventh embodiment is an alternative embodiment of the embodiment of FIG. 9, where the two groups 20-21 of the power electronics converters 40A, 40C and 40B, 40D, respectively, are connected to the same power source 80.

There can be a combination of different connections of the power electronics converters 40A-D in the same energy conversion system. E.g., some power electronics converters can be connected in parallel and some power electronics converter can be connected in series.

The inventive embodiments are applicable for operation in both motoring and generating modes.

The above described embodiments can be combined and modified to form other embodiments within the scope of the attached claims.

Modifications

In a modification, the energy conversion system comprises any number of concentric rings.

In a further modification, the power electronics converter group(s) contains switches for disconnection and by-pass of the individual power electronics converter in case of a fault of such power electronics converter.

In a further modification, power electronics converters can be of DC/AC, AC/AC, DC/DC or AC/DC type.

In a further modification, the same energy conversion system can contain power electronics converters of different types, e.g. DC/DC and DC/AC.

In a further modification, two or more of the power electronics converters are integrated with each other forming one mechanical unit.

In a further modification the concentric rings can be fed by AC or DC current or generate AC or DC current.

In a further modification there can be added filters, e.g. such as inductors, between the power electronics converters and the concentric rings in order to reduce current ripple.

In a further modification the concentric rings can be produced by additive manufacturing method, e.g. 3D printing, lithography or similar.

In a further modification the concentric rings can also be made by forming one long electromagnetic sheet consisting of two or more electromagnetic mats into several layers with the same number of layers as number of mats in the sheet, where each layer is the electromagnetic mats from the sheet and where each layer is not galvanically or electrically connected to each other, so they form individual concentric windings.

In a further modification the concentric rings can be operated or energized at different periods of time, switching some of them off and then turning them on again, for example to let some of them to cool down while the other concentric rings are converting power.

In a further modification, the concentric rings can be mechanically integrated with a core to form a stator or a rotor, wherein the core can have its own winding placed in slots thereof.

In a further modification, the concentric rings are made like a truncated cone ("concentric cones"), where the topmost diameter of the truncated cone is lower or higher than the bottom diameter of the truncated cone, so to create a cylinder with varying diameter. The concentric cones can be manufactured identically and stacked inside or on top of each other so to simplify production.

LIST OF DESIGNATIONS 10 current carrying component of an electric machine, such as a part of a stator or a rotor
20-21 groups of power electronics converters
30A-D concentric rings
300A-F segments of the concentric rings
40A-F power electronics converter
50A-F connection lines comprising AC or DC line having one or more phases
60A-D voltages at non-machine side terminals of the power electronics converters
70 DC voltage on DC link
80-81 power source

The invention claimed is:

1. An energy conversion system comprising:
an electrical machine comprising at least one current carrying component (10); and
at least two power electronics converters (40A-40F) each having machine side terminals and non-machine side terminals, each of the power electronics converters (40A-40F) being connected to the electrical machine via the respective machine side terminals, wherein
the at least one current carrying component (10) of the electric machine comprises at least two concentric rings (30A-30D) forming the current carrying component (10),
the at least two concentric rings (30A-30D) are not galvanically or electrically connected to each other, and
each of the at least two concentric rings (30A-30D) is galvanically connected to at least one of the at least two power electronics converters (40A-40F) via its machine side terminals but not connected to all of the at least two power converters (40A-40F) simultaneously.

2. The energy conversion system according to claim 1, wherein at least two of the at least two power electronics converters (40A-40F) are connected in series through the respective non-machine side terminals.

3. The energy conversion system according to claim 1, wherein at least one of the at least two concentric rings is made of segments (300A-300F) connected to separate power electronics converters.

4. The energy conversion system according to claim 1, wherein the at least two concentric rings do not contain solid ferromagnetic cores within bodies of the concentric rings.

5. The energy conversion system according to claim 1, wherein the at least two concentric rings are made of litz wire or solid wire and epoxy or other matrix material.

6. The energy conversion system according to claim 1, wherein the at least two concentric rings or respective parts that make up the at least two concentric rings are made of a sheet comprising two or more electromagnetic mats.

7. The energy conversion system according to claim 6, wherein at least one of the two or more electromagnetic mats comprises both copper fibers and ferromagnetic fibers.

8. The energy conversion system according to claim 1, wherein the winding patterns of the at least two concentric rings are aligned with each other.

9. The energy conversion system according to claim 1, wherein waves of current in the at least two concentric rings are synchronized.

10. The energy conversion system according to claim 1, wherein control of the electric machine is performed with the help of a position sensor.

11. The energy conversion system according to claim 1, wherein current waveforms in the at least two concentric rings are arranged relative to each other for cancelling out harmful harmonics.

12. The energy conversion system according to claim 1, wherein at least one element is arranged between the at least two concentric rings.

13. The energy conversion system according to claim 12, wherein the at least one element is a cooling duct or insulation.

14. The energy conversion system according to claim 1, wherein the at least two power electronics converters are surrounded by the concentric rings to form an integrated design.

15. The energy conversion system according to claim 1, wherein at least one of the at least two concentric rings is fed by AC current and at least one of the at least two concentric rings is fed by DC current.

16. The energy conversion system according to claim 1, wherein at least two of the at least two power electronics converters are mechanically integrated with each other forming one mechanical unit.

17. An energy conversion system comprising:
an electrical machine comprising at least one current carrying component (10); and
at least two power electronics converters (40A-40F) each having machine side terminals and non-machine side terminals, each of the power electronics converters (40A-40F) being connected to the electrical machine via the respective machine side terminals, wherein
the at least one current carrying component (10) of the electric machine comprises at least two concentric rings (30A-30D) forming the current carrying component (10),
the at least two concentric rings (30A-30D) are not galvanically or electrically connected to each other,
each of the at least two concentric rings (30A-30D) is galvanically connected to at least one of the at least two power electronics converters (40A-40F) via its machine side terminals but not connected to all of the at least two power converters (40A-40F) simultaneously, and
the at least two concentric rings do not contain solid ferromagnetic cores within bodies of the concentric rings.

18. An energy conversion system comprising:
an electrical machine comprising at least one current carrying component (10); and
at least two power electronics converters (40A-40F) each having machine side terminals and non-machine side terminals, each of the power electronics converters (40A-40F) being connected to the electrical machine via the respective machine side terminals, wherein
the at least one current carrying component (10) of the electric machine comprises at least two concentric rings (30A-30D) forming the current carrying component (10),
the at last two concentric rings (30A-D) have different diameters such that they fit radially inside of each other,
the at least two concentric rings (30A-30D) are not galvanically or electrically connected to each other, and
each of the at least two concentric rings (30A-30D) is galvanically connected to at least one of the at least two power electronics converters (40A-40F) via its machine side terminals but not connected to all of the at least two power converters (40A-40F) simultaneously, and the at least two concentric rings do not contain solid ferromagnetic cores within bodies of the concentric rings.

19. The energy conversion system of claim 18, wherein the current carrying component (10) comprises a winding of the electric machine.

* * * * *